US00RE38745E

(19) United States
(12) Reissued Patent
Foster

(10) Patent Number: US RE38,745 E
(45) **Date of Reissued Patent: *Jun. 21, 2005**

(54) LAMINATE FILM-FOAM FLOORING COMPOSITION

(75) Inventor: Stephen M. Foster, Kenneth Square, PA (US)

(73) Assignee: Pactiv Corporation, Lake Forest, IL (US)

( * ) Notice: This patent is subject to a terminal disclaimer.

(21) Appl. No.: 09/952,913

(22) Filed: Sep. 14, 2001

Related U.S. Patent Documents

Reissue of:
(64) Patent No.: 5,952,076
Issued: Sep. 14, 1999
Appl. No.: 08/798,632
Filed: Feb. 11, 1997

(51) Int. Cl.[7] ..... B32B 3/14; B32B 27/32; E04B 5/02; E04F 15/20

(52) U.S. Cl. ..... 428/77; 428/78; 428/40.1; 428/317.7; 428/318.6; 428/319.9; 428/352; 428/215; 52/396.04; 52/403.1; 52/408; 52/480

(58) Field of Search ..... 428/317.7, 318.6, 428/319.9, 77, 78; 52/403.1, 408, 480, 396.04

(56) References Cited

U.S. PATENT DOCUMENTS

| | | | | | |
|---|---|---|---|---|---|
| 3,499,819 | A | * | 3/1970 | Lewis | 161/161 |
| 3,607,603 | A | * | 9/1971 | Coverdale, Jr. | 161/160 |
| 3,608,006 | A | * | 9/1971 | Hosoda et al. | 156/79 |
| 3,666,611 | A | * | 5/1972 | Joa | 161/147 |
| 3,991,252 | A | * | 11/1976 | Kolakowski et al. | 156/71 |
| 4,073,998 | A | * | 2/1978 | O'Connor | 428/310 |
| 4,121,958 | A | * | 10/1978 | Koonts | 156/79 |
| 4,201,609 | A | * | 5/1980 | Olsen | 156/85 |
| 4,243,619 | A | * | 1/1981 | Fraser et al. | 264/210.1 |
| 4,271,218 | A | * | 6/1981 | Heckel et al. | 428/36 |
| 4,310,587 | A | * | 1/1982 | Beaupre | 428/246 |
| 4,421,807 | A | | 12/1983 | Clausing et al. | 428/41 |

(Continued)

FOREIGN PATENT DOCUMENTS

| | | | |
|---|---|---|---|
| DE | 6605008 | 12/1983 | |
| GB | 578697 | * 7/1946 | |
| WO | WO 90/14945 | * 12/1990 | B32B/9/00 |

OTHER PUBLICATIONS

Brochure entitled "Traffic Zone Construction," Bruce Floors, a business unit of Triangle Pacific Corp. (Apr. 1996).*

Brochure entitled "Introducing Astro–BarrierTM—Foam Film Underlayment For The Laminate Flooring Industry," Astro–Valcour Inc. (Jun. 28, 1996).*

*Primary Examiner*—Terrel Morris
*Assistant Examiner*—Hai Vo
(74) *Attorney, Agent, or Firm*—Jenkens & Gilchrist

(57) ABSTRACT

A laminate composition of a thin film of low density polyethylene adhered to a sheet of low density polyethylene foam by means of a very thin layer of low density polyethylene. The polyethylene foam has a low density which is preferably between about 1.9 pcf and about 2.2 pcf. The bottom polyethylene film serves as a vapor barrier. One side of the polyethylene film extends beyond one edge of the polyethylene foam sheet. The laminate composition is installed in a free floating manner on the concrete subflooring, with the polyethylene film or the polyethylene foam sheet contacting the surface of the concrete subflooring. The laminate composition is usually in long strips, so when it is installed one edge of one strip overlies the extended portion of the polyethylene film of an adjacent strip. Then the laminate wood finish flooring, in plank form, is installed on top of the laminate composition in a free floating manner. The laminate wood planks fit together in a tongue-in-groove manner and are glued together.

26 Claims, 1 Drawing Sheet

U.S. PATENT DOCUMENTS 4,657,811 A * 4/1987 Boyd et al. ..... 428/318
4,682,459 A 7/1987 Stephenson ..... 52/390
4,910,936 A * 3/1990 Abendroth et al. ..... 52/403.1
4,974,382 A * 12/1990 Avellanet ..... 52/408
5,100,725 A * 3/1992 Pearson ..... 428/314
5,103,614 A * 4/1992 Kawaguchi et al. ..... 52/392
5,137,764 A * 8/1992 Doyle et al. ..... 428/44
5,173,346 A * 12/1992 Middleton ..... 428/53
5,316,835 A * 5/1994 Groft et al. ..... 428/247
5,617,687 A * 4/1997 Bussey et al. ..... 156/71

* cited by examiner

LAMINATE FILM-FOAM FLOORING COMPOSITION

Matter enclosed in heavy brackets [ ] appears in the original patent but forms no part of this reissue specification; matter printed in italics indicates the additions made by reissue.

BACKGROUND OF THE INVENTION

1. Field of the Invention

The invention relates to laminate compositions (products) for use in combination with wood laminate flooring over concrete subflooring.

2. Background Art

The floor system in a building contains a subflooring and a finish flooring.

A wood floor system has wood or steel joists supporting both the subflooring and the finish flooring. The subflooring is often (e.g., one-inch thick) softwood or hardwood boards or plywood panels. The finish flooring is typically thinner and often is hardwood boards. Wood floor systems are usually used in residences or apartments.

The floor system in steel-framed buildings is typically supported by open-web steel bar joists or steel beams. The floor deck or subflooring on the bar joists or beams can be, for example, a steel deck, a precast concrete slab or panels, or a precast hollow-core concrete slab or panels.

The floor system can be a reinforced-concrete floor system. This type of floor system is used in buildings, usually multi-floor buildings. The floor system in a reinforced structure is commonly constructed in a monolithic manner with the structural framing system. The reinforced-concrete subflooring can be flat-slab construction (reinforced in two directions), flat-plate construction or slab-band construction.

The floor finish or wearing surface is located over the wood, steel or concrete subfloor. The floor finish can be wood or resilient tile or sheet. The wood floor finish can be softwood or hardwood—usually oak, yellow pine or maple are used. The shapes and finishes of the wood floor finish are commonly matched flooring, plank-finished flooring, parquet flooring and wood-block flooring. The resilient flooring can be linoleum, asphalt tile, or vinyl or rubber tile or sheet.

When wood flooring is installed directly onto a concrete floor in a building, the result is a floor which has essentially no resiliency. People walking and standing on such floors often have tired and stressed feet, legs, knees, backs, etc., plus they sometimes suffer damage to their feet, knees, etc., particularly over extended and repetitive periods of standing or walking.

In the construction of buildings having concrete subfloors, it is known to install a thin layer of polyethylene film on the concrete subflooring, followed by a layer of polyethylene foam sheet on the thin polyethylene film, and vice versa, and then to install wood flooring on top of the polyethylene foam sheet layer. None of the layers or flooring are adhered to any of the other layers or flooring. The polyethylene foam sheet takes out small irregularities in the top surface of the concrete. The polyethylene foam sheet also provides some sound reduction. Slight cushioning is provided by the polyethylene foam sheet to alleviate the problems suffered by persons walking and standing on such floors.

The polyethylene film is usually in strip form and is laid down so that the strip edges overlap by a few inches. The polyethylene foam sheet is supplied to and applied by the art in the form of long strips. The installer lays two foam strips and then tapes the facing edges together, then lays another foam strip and goes through the taping operation, etc.

BROAD DESCRIPTION OF THE INVENTION

An object of the invention is to provide a laminated composition of polyethylene foam sheet and polyethylene film used in the installation of laminate wood floors to provide a vapor-barrier, some cushioning, smoothing out of small surface irregularities of the concrete, cost savings and increased ease and efficiency in installation. Another object is to provide a method for preparing the laminated composition. A further object is to provide a method for installing the laminated composition in laminate wood flooring on a concrete subflooring. Other objects and advantages of the invention are set out herein or are obvious herefrom to one skilled in the art.

The objects and advantages of the invention are achieved by the compositions, products, articles of manufacture and processes of the invention.

The invention involves a laminated composition of polyethylene foam sheet and polyethylene film used in the installation of laminate wood floors to provide both a vapor-barrier and cushioning.

A laminate composition of thin film of low density polyethylene adhered to a sheet of low density polyethylene foam by means of a very thin layer of low density polyethylene. The polyethylene foam has a low density which is preferably between about 1.9 pcf and about 2.2 pcf. The bottom polyethylene film serves as a vapor barrier. One side of the polyethylene film preferably extends beyond one edge of the polyethylene foam sheet. The laminate composition is installed in a free floating manner on the concrete subflooring, with the polyethylene film or the polyethylene foam sheet contacting the surface of the concrete subflooring. The laminate composition is usually in long strips. In the preferred embodiment where one side of the polyethylene film extends beyond one edge of the polyethylene foam sheet, the laminate composition is installed so that one edge of one strip overlies the extended portion of the polyethylene film of another strip. In this manner the edges of the two strips do not have to be taped to keep the strips from moving during installation of the laminate wood flooring, etc. Also, the result is more efficient and provides labor cost savings. Then the laminate wood finish flooring, in plank form, is installed on top of the laminate composition in a free floating manner. The laminate wood planks fit together in a tongue-in-groove manner and are glued together.

The invention, a laminate composition of a thin polyethylene foam sheet on a thin polyethylene film, is used in the installation of laminate wood floors to provide a vapor-barrier, cushioning, sound reduction, etc.

The laminate composition of the invention is a combination of sound-reducing polyethylene foam sheet or vapor-barrier polyethylene film. The laminate composition can be provided in the form of a single-roll foam/film underlayment, which reduces labor cost and time in its installation. If the foam sheet and the film are in separate form, installers would have to deal with two separate rolls and the increased labor cost and installation time. Separate film and foam sheet would make installation more difficult and costly.

The invention also involves a process of preparing the invention laminate composition, a process of installing the invention laminate composition in a flooring arrangement of a concrete subflooring and a laminate wood flooring, and such flooring arrangement which includes the laminate composition.

DETAILED DESCRIPTION OF THE INVENTION

Figure 1:
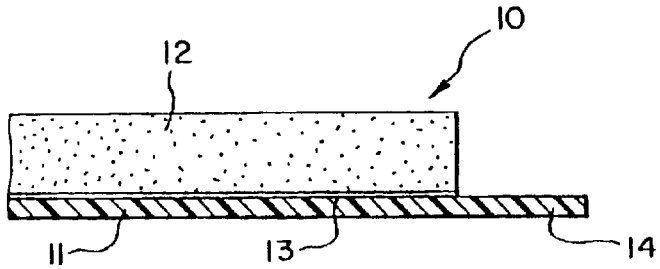
FIG. 1 is a cross-sectional view of the laminate composition of the invention.

The description in this specification is primarily done with polyethylene for the polyethylene foam sheet and the polyethylene film. The preferred polyethylene is low density polyethylene. But the invention also more broadly includes the use of polyethylenic resins.

The polyethylenic resins used in the invention process can be those obtained by polymerizing ethylene, or polymerizing ethylene with other aliphatic monoolefins, such as, propylene, 1-butene, 1-pentene, 3-methyl-1-butene, 4-methyl-1-pentene, 4-methyl-1-hexene, or 5-methyl-1-hexene alone or mixtures thereof, or with various other polymerizable compounds.

The polyethylenic resins useful in the invention process include homopolymers of ethylene and copolymers of ethylene and other ethylenically-unsaturated monomers having from 3 to about 8 carbon atoms, such as, propylene, butenes, pentenes, hexenes and the like. These comononers preferably have from 3 to about 6 carbon atoms, and, most preferably, have 3 or 4 carbon atoms. The copolymers can include other monomers compatible with ethylene. Particularly preferred are low density polyethylene, and linear low density polyethylene. Such polyethylenes are described in the Kirk Othmer Encyclopedia of Chemical Technology, Third Ed., Vol. 16, pages 385, 420, the Modern Plastics Encyclopedia, (1986–87), pages 52–63, and the Encyclopedia of Polymer Science and Technology, Vol. 7, page 610.

The term "polyethylenic resin (or material)", as used herein, is meant to include not only homopolymers of ethylene, but also ethylene copolymers composed both of at least 50 mole percent (preferably at least 70 mole percent) of an ethylene unit and a minor proportion of a monomer copolymerizable with ethylene, and blends of at least 50 percent by weight (preferably at least 60 percent by weight) of the ethylene homopolymer or copolymer with another compatible polymer.

Examples of monomers which are copolymerizable with ethylene are vinyl acetate, vinyl chloride, propylene, butene, hexene, acrylic acid and its esters, and methacrylic acid and its esters. The ethylene homopolymer or copolymer can be blended with any polymer compatible with it. Examples of such compatible polymers include polypropylene, polybutadiene, polyisoprene, polychloroprene, chlorinated polyethylene, polyvinyl chloride, styrene/butadiene copolymer, vinyl acetate/ethylene copolymer, acrylonitrile/butadiene copolymer and vinyl chloride/vinyl acetate copolymer. Preferred examples of such compatible polymers are polypropylene, polybutadiene and styrene/butadiene copolymer.

Examples of polyethylenic resins which can be advantageously employed in the invention are low-, medium- and high-density polyethylenes, ethylene/vinyl acetate copolymer, ethylene/propylene copolymer, copolymers of ethylene and methyl or ethyl acrylate, blends of polyethylene and polypropylene, blends of polyethylene and ethylene/vinyl acetate copolymer, and blends of polyethylene and ethylene/propylene copolymer. Of these, the medium density polyethylenes, low density polyethylenes, and ethylene/propylene copolymers are especially suitable.

The preferred polyethylenes are uncrosslinked, low density polyethylene having a density in the range of 910 to 930 kg/m$^3$. Crosslinked polyethylenes can be used.

The polyethylenes used in the invention process are uncrosslinked.

In addition to polyethylenic resins, homopolymers and copolymers of polypropylene can be used in the invention.

By way of definition, polyethylene films are 10 mils thick or less, and polyethylene sheets are greater than 10 mils thick.

The polyethylene foam sheet can be formed by means of a conventional polyethylene foam sheet extrusion process or any other suitable foam sheet-forming process.

In a typical, conventional polyethylene foam sheet extrusion process, pellets of the thermoplastic polyethylene resin are blended with a solid phase nucleating agent and, then, are melted in a heated extruded where the plastic and nucleating agent combination is held at both a high temperature and a high pressure. The physical blowing agent(s), which generally liquefies within the extruder, and which will vaporize at die melt temperatures and atmospheric pressure, is added to the pressurized melted material. Within the molten extrudate, the blowing agent(s) tends to act as a plasticizer to reduce the viscosity of the extrudate, and, thus, it lowers the level of temperature necessary to maintain the hot melt condition of the mixture of thermoplastic polyethylene material and nucleating agent. The blowing agent(s) is mixed with the melted polyethylenic plastic and nucleating agent, and the combination is, subsequently, cooled to an extrusion temperature suitable for foaming. To prevent the collapse of the resulting foam structure over time, a permeation modifier agent, which is usually an ester of a fatty acid having a chain of 16 to 22 carbon atoms, is often also added to the melt composition in the extruder (or as otherwise conventional or suitable). The cooled combination is pushed through a die by the pressure gradient, and, when released to atmospheric pressure, the liquefied physical blowing agent (s) vaporizes and expands to form bubbles of gas at the nucleating sites established by the uniformly dispersed nucleating agent particles. Preferably, low-density polyethylene as the plastic, isobutane as the blowing agent, crystalline silica as the nucleating agent, and glyceryl monostearate as the permeation modifier are used in the preparation of the polyethylene foam sheet.

The process can be usually operated on a continuous basis using a conventional extruder system.

The nucleating agent (cell size control agent) can be any conventional or useful nucleating agent(s). The cell size agent is preferably used in an amount of 0.5 to 2.0 weight percent, depending upon the desired cell size, based upon the weight of the polyethylenic resin. Examples of the cell size control agents are inorganic cell size-controlling agents (in very small particulate form), such as, clay, talc, silica, and organic cell size-controlling agents which decompose or react at the heating temperature within the extruder to evolve gases such as a combination of an alkali metal salt of a polycarboxylic acid, such as, sodium hydrogen tartrate, potassium hydrogen succinate, sodium citrate, potassium citrate or sodium oxalate (or a polycarboxylic acid such as citric acid) with a carbonate or bicarbonate, such as, sodium bicarbonate, sodium carbonate, potassium bicarbonate, potassium carbonate or calcium carbonate. A combination of the monoalkali metal salt of a polycarboxylic acid, such as, monosodium citrate or monosodium tartrate, with a carbonate or bicarbonate is an example. Preferred cell size control agents are talc or a stochiometric mixture of citric acid and sodium bicarbonate (the mixture having a 1 to 100 percent concentration where the carrier is the base resin). The most preferred cell size control agent is crystalline silica. Mixtures of cell size control agents can be used.

Suitable volatile blowing agents include halocarbons such as fluorocarbons and chlorofluorocarbons; hydrohalocarbons such as hydrofluorocarbons and hydrochlorofluorocarbons; alkylhalides such as methyl chloride and ethyl chloride; hydrocarbons such as alkanes or alkenes; and the like. Other suitable blowing agents include pristine blowing agents such as air, carbon dioxide, nitrogen, argon, water, and the like. The blowing agent may comprise a mixture of two or more of any of the above blowing agents.

Preferred blowing agents are hydrocarbons, which include alkanes having from 2 to 9 carbon atoms. Preferred alkanes include butane, isobutane, pentane, isopentane, hexane, isohexane, and the like. A most preferred blowing agent is isobutane.

The blowing agent(s) can be inorganic halogen-free blowing agents which are environmentally acceptable and inflammable. Examples of the inert inorganic atmospheric gases are argon, carbon dioxide, water, nitrogen, neon, helium and krypton (but not, for example, oxygen, ozone, sulfur dioxide, methane or nitrous oxide). Mixtures can be used. When two blowing agents are used, they can be individually injected into separate injection ports or they can be injected together into the same injection port in the mixing extruder. The argon blowing agent usually is used at a rate of 0.1 to 4 weight percent, preferably 0.1 to 2.0 weight percent, of the total extruder flow rate. The carbon dioxide blowing agent usually is used at a rate of 0.5 to 7.0 weight percent, preferably 0.5 to 5.0 weight percent, of the total extruder flow rate. The nitrogen blowing agent usually is used at a rate of 0.1 to 2 weight percent of the total extruder flow rate.

The permeation modifier (or stability control agent), when used, is generally used in the amount of 0.1 to 10 parts by weight (best 0.5 to 5 parts by weight) per 100 parts of the polyethylenic resin. When used, the permeation modifiers are present in amounts effective to adjust the permeability of the polyethylenic polymer foam cell walls to the blowing agent(s) used, relative to air or other ambient atmosphere, so as to help produce the desired rate and degree of purging of the blowing agent(s). Any useful permeation modifiers can be used.

The permeation modifier can be an ester of a long-chain fatty acid and a polyhydric alcohol. Generally, such esters are the esters of a fatty acid having from 8 to 20 carbon atoms and a polyhydric alcohol having from 3 to 6 hydroxyl groups. Examples of such esters are glycerol monolaurate, glycerol dilaurate, glycerol trilaurate, glycerol monopalmitate, glycerol dipalmitate, glycerol tripalmitate, glycerol monostearate, glycerol distearate, glycerol tristearate, glycerol monooleate, glycerol dioleate, glycerol trioleate, glycerol monocaprylate, glycerol dicaprylate, glycerol tricaprylate, sorbitan monopalmitate, sorbitan monolaurate, sorbitan monostearate and sorbitan monooleate, and a mixture of at least two of such esters. The preferred permeation modifiers are glycerol monostearate and glycerol monooleate.

The partial esters of long-chain fatty acids and polyhydric alcohols are described in U.S. Pat. No. 3,644,230, the pertinent portions of which are incorporated herein by reference.

The permeation modifier can be a saturated higher fatty acid amide, a saturated higher aliphatic amine or a complete ester of a saturated higher fatty acid disclosed in U.S. Pat. Nos. 4,217,319 and 4,214,054, the pertinent portions of which are incorporated herein by reference.

Other conventional or suitable additives, such as, coloring agents, fire retardants, stabilizers, fillers, antioxidants and plasticizers, can be used.

The foam sheet provides sound reduction and cushioning.

The density of the polyethylene foam sheet is a low density, usually between 1 pcf and 5 pcf, preferably about 1.9 pcf to about 2.2 pcf, and most preferably about 2.2 pcf.

The polyethylene foam sheet is preferably about 0.075 inch in thickness but can have any other suitable thickness (e.g., between about 0.03 inch and about 0.1 inch in thickness).

The polyethylene foam sheet should be closed celled in the sense that the at least half of the cells are closed cells and preferably at least 80 percent of the cells are closed cells. A high closed cell content is advantageous because the polyethylene foam sheet then has a slight degree of elasticity while having the necessary structural integrity and resilience when subjected to transient or static loads of light or comparative heavy values. The slight degree of elasticity helps to eliminate the "pounding" which the feet, legs, knees, back, etc., of a person walking or standing on the floor are subjected to when no foam sheet is located between the wood finish flooring and the concrete subflooring. The polyethylene foam sheet must also have enough foam structure integrity so as not to compress too much when a heavy load is applied to the wood finish flooring.

The polyethylene film can be formed by means of a conventional polyethylene film extrusion process or any other suitable film-forming process.

In a typical, conventional polyethylene film extrusion process termed the blown tubing process, the thin polyethylene film is extruded on a continuous basis by extruding a tube of the polyethylene in molten state through an annular nozzle behind which is a device through which air is introduced into the emerging tube. The air expands the tube to several times its original diameter. The expanded tube is cooled in air or by cooling rings which provide an even distribution of forced air. The cooled tubing is collapsed by guide systems or pressed between rollers. The polyethylene is then pressed between rollers over which the film passes as a double layer. Thereafter, the flattened tube is single slit or double slit in the lengthwise direction so as to provide one or two flat films, respectively. The blowup (expansion) of the tube results in the film having orientation in both directions. The blown tubing process is best for preparing low density polyethylene film (having a width of up to 240 inches or so).

Other conventional polyethylene film extrusion processes are the chill roll process and the water quench process. A slot die is used in the chill roll process. Molten polyethylene from the die goes to a highly polished, temperature-controlled roll which cools and solidifies it. The water quench method is similar to the chill roll process except that the extrudate is cooled in a water bath.

The thin polyethylene film can also contain flame retardants, stabilizers, antioxidants, colorants, fillers, plasticizers or any other conventional or suitable additives.

The thin polyethylene film preferably is about 5 mils (0.005 inch) thick but can have any other suitable thickness (e.g., between about 0.001 inch and about 0.01 inch in thickness).

The polyethylene film of the laminate composition provides a vapor barrier. The laminate finish flooring often has a moisture resistant lower ply, but this ply does not provide a vapor barrier.

One reason that the laminate composition of the invention should not be used with a wood subflooring is that the vapor barrier provided by the polyethylene film prevents the upward passage of moisture vapor which causes the rotting of the wood subflooring.

Low density polyethylene film has a water vapor permeability of about 1.4 grams/24 hours/$m^2$/mm thick/cm Hg at 25° C.

Low density polyethylene films can be extruded which have widths of up to 480 inches or so.

In FIG. 1, laminate composition 10 includes bottom film 11 and top foam sheet 12. Portion 14 of bottom film 11 extends (preferably 4 inches) beyond one side of foam sheet 12. Bottom film 11 is composed of low density polyethylene. Top foam sheet 12 is composed of low density polyethylene foam having a density of about 2 pcf. In laminate 10, top foam sheet 12 and bottom film 11 are adhered together by means of a low density polyethylene (100 percent) virgin resin—see layer 13. The process of preparing laminate is described below in the description of FIG. 2.

The polyethylene foam sheet and the polyethylene film are laminated together by any suitable means or scheme. Preferably the polyethylene foam is extruded in sheet form and essentially immediately thereafter laminated to the polyethylene film. The polyethylene film and the polyethylene foam sheet can be laminated together by the use of heat and/or adhesive.

One process of preparing the laminate composition involves bringing together a moving continuous web of a thin sheet of polyethylene foam and a moving continuous web of a thin film of polyethylene. An adhesive is applied to the facing surfaces of the moving webs at the point of contact between the moving webs, and then sufficient pressure (without damaging the polyethylene foam) is applied by two opposing rollers to the contacting webs at the point of contact of the moving webs to achieve the laminate composition. The nip pressure applied by the opposed rollers on the laminate is typically between 0 to 10 pcf and about 150 pcf, and preferably is about 60 pcf.

Preferably the moving continuous web of thin polyethylene foam sheet is formed by extrusion, passed through at least one oven, and, while being at a temperature between 350° F. and 500° F., brought into contact with the moving continuous web of thin polyethylene film. Preferably the rollers are chilling rollers (which are preferably at about 60° F.).

In the most preferred embodiment the moving continuous webs move downward and, before contacting each other, are oriented at opposing slight angles to the vertical. The adhesive is in a liquid form and is dropped into the point of contact of the moving webs. Preferably, the liquid adhesive is molten low density polyethylene, the web of polyethylene foam sheet is composed of low density polyethylene, and the web of polyethylene film is composed of low density polyethylene.

Any suitable adhesive such as hot oil may be used, but low density polyethylene is preferred, for laminating the sheet and the film.

The foam sheet can be that obtained from a third party or manufactured on site and later used, but in either case it is best to reheat the foam sheet just before it is laminated with the polyethylene film. But most preferably the lamination is done using extruded foam sheet at an elevated temperature immediately after exiting the oven(s) downstream from the extruder.

The laminate composition is conveniently wound onto mandrels to provide a master roll(s), that is, large rolls. The master rolls can be treated by a converter for making a finished product(s), that is, mini-rolls, bagging, labeling and cartoning. Typically the master rolls produced at the production site are shipped to the converter to provide the smaller or mini-rolls for sale to distributors or end users.

The laminate composition on the mini-rolls typically is 52 inches wide (the foam sheet having a width of 48 inches with the film extending 4 inches further on one side of the film sheet) and 50 (linear) feet long.

Figure 2:
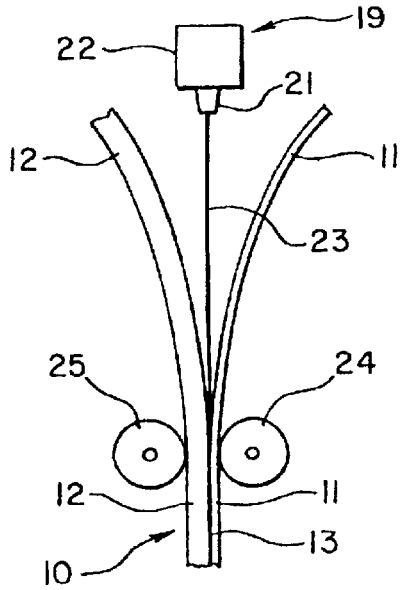
FIG. 2 is a side view of one scheme of laminating the laminate composition of FIG. 1.

In FIG. 2, an extruded web 12 of low density polyethylene foam sheet and an extruded web 11 of low density polyethylene film are fed downwardly between chill rolls 24 and 25. Extruded web 12, coming from an extruder and an oven(s) at the proper cell height and preferably at a temperature of about 450° F., is immediately fed to chill rolls 24 and 25. At this point, extruded web 12 has a density of about 2.1 to about 2.2 pcf.

Extruded web 11 is usually at room temperature or slightly higher as it is fed to chill rolls 24 and 25. Extruded web 11 preferably has a thickness of abut 5 mils and extruded web 12 preferably has a thickness of about 0.075 inch. Webs 11 and 12 form a vee (V) as they approach chill rolls 24 and 25. Typically, web 12 has a width of 48 inches, web 11 has a width of 52 inches, and web 11 is aligned with web 12 so that web 11 extends 4 inches over one side of web 12. The nip pressure at chill rolls 24 and 25 is preferably about 60 psi. The surface temperature of chill rolls 24 and 25 is preferably about 60° F. Stream 23 of molt en low density polyethylene (100 percent) virgin resin drops from container arrangement 19 into and, along the entire length of, the apex of the vee (v) formed by webs 11 and 12 as they enter the nip of chill rolls 24 and 25. The low density polyethylene is in molten form in container 22 and flows downward through nozzle 21 to form a stream. Container 22 has a length of at least 48 inches. Nozzle (extruder) 23 has an opening which has a length of 48 inches. Stream 23 has a horizontal length of 48 inches. The molten low density polyethylene stream (extrudate) 23 is formed into thin adhesive layer 13 (having a thickness of about 1 mil) as webs 11 and 12 pass through chill rolls 24 and 25. Thin adhesive layer 13 bonds webs 11 and 12 together to form the invention laminate composition 10. Web 12 of laminate composition 10 preferably has a temperature of about 114° F. as it exits chill rolls 24 and 25. The line speed of webs 11 and 12 (and hence laminate composition 10) is preferably 60 to 70 feet per minute. Laminate composition 10, in web form, progresses to a winder (not shown) to form large rolls (e.g., of 1500 linear feet). Web 12 of laminate composition 10 preferably has a temperature of about 75° F. at the winder. The density of low density polyethylene foam sheet preferably drops to about 2 pcf once the roll has been formed and with aging. FIG. 2 illustrates the preferred continuous method of in-line lamination to form the invention laminate composition (in web form).

The laminate composition of LDPE foam sheet/LDPE film underlayment of the invention is commercially available to the laminate flooring industry under the trademark ASTRO-BARRRIER™ from the Astro-Valcour, Inc., Building Products Division, 18 Peck Avenue, Glen Falls, N.Y. 12801. A preferred laminate composition is the one commercially available under the trademark ASTRO-BARRIER™. The low density polyethylene foam sheet has a density of about 2.0 psi, a thickness of about 0.075 inch, and a width of about 48 inches. The low density polyethylene film has a thickness of about 0.005 inch and a width of about 52 inches, with about 4 inches thereof extending past one side of the low density polyethylene foam sheet. The LDPE foam sheet and the LDPE film are bonded together by a thin layer (about one mil) of low density polyethylene (100 percent) virgin resin (which acts as an adhesive). The ASTRO-BARRIER™ laminate composition is manufactured in roll form, the master rolls of approximately 52 inch by about 1500 feet long are sent to converters located throughout the country. They then rewind the m aster rolls into mini-rolls for retail sale; the length of the mini-rolls is most commonly 50 feet. The mini-rolls are then packaged into clear polyethylene bags and packed into a carton, bar-coded, labeled, palletized, then shipped to the customer's distribution center. The customer then has a retail roll ready for sale after it has left the converter.

The subflooring is preformed or precast concrete, cast-in-place concrete or reinforced concrete (i.e., contains added material of high strength, such as, steel rods or bars).

The laminate wood flooring can be any suitable one including those which are commercially available. (Any other suitable free-floating finish flooring can be used in place of the laminate wood finish flooring.)

An example of a suitable laminate wood (finish) flooring, in plank form, is one which has a four-ply construction and which is used where there is high personnel traffic, for example. The top (first) ply is a clear translucent layer and is a durable wear and stain resistant, resilient finish. The next (second) ply is an image design layer upon which product patterns, such as, wood, marble or granite patterns, are printed. The third ply is a moisture resistant, high-density core material that maintains the structural integrity of each precision engineered plank. The bottom (fourth) ply is composed of melamine for structural stability and seals the bottom of each laminate wood plank flooring for additional stability and moisture resistance. The four-ply construction is fused together under tremendous heat and pressure to form a single plank. The plank dimensions are 5/16 inch by 7⅞ inches by 50⅝ inches, although the laminate wood flooring plank used by the art usually are four inches wide and four feet long.

When installing a wood laminate floor over a concrete slab, the installer must first lay down a vapor-barrier of polyethylene film (usually 8-mils in thickness), and then apply a closed-cell polyethylene foam sheet for both cushioning and sound reduction. (Of course, installers sometimes first lay down the foam sheet and then the film.) The vapor-barrier is not necessary, however, when installing over a wood sub-floor such as plywood, or a pre-existing wood floor. The wood laminate floors usually come in planks of 48 inches long by 4 inches wide, and are tongue-in-groove in their application design. After they have been glued together, the floor is then totally "free-floating", and not attached to any other surface. The invention replaces the separate polyethylene film and the separate polyethylene foam sheet with the invention laminate composition of a polyethylene foam sheet laminated with a polyethylene film. Thereby, installation is less complicated, quicker, more reliable and less costly.

Figure 3:
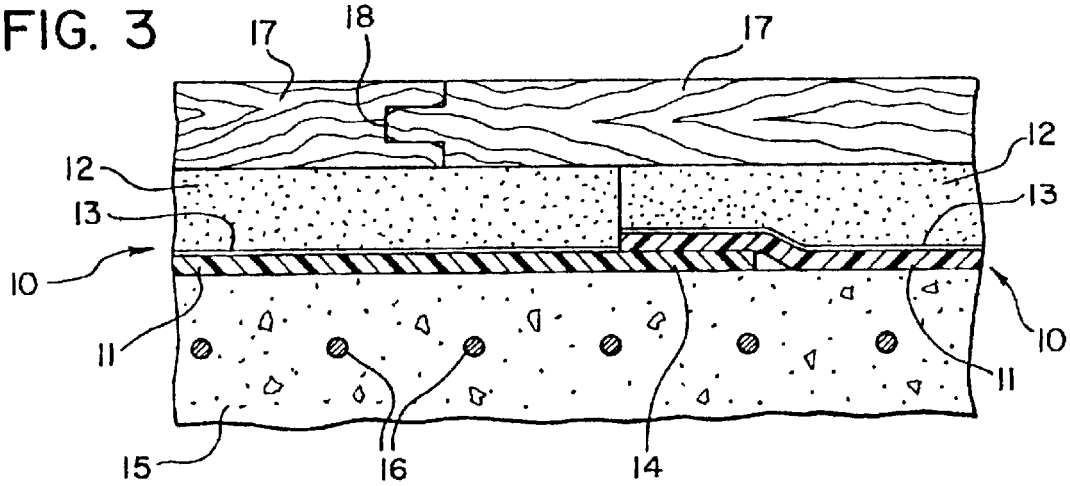
FIG. 3 is a cross-sectional view of a floor including the laminate composition of FIG. 1.

In FIG. 3, laminate composition 10 is positioned on reinforced concrete subflooring 15 (with steel reinforcing rods 16) in a free-lying manner. Laminate composition 10 is in the form of strips, two adjacent strips being shown in FIG. 3. Laminate composition 10 is not adhered to concrete subflooring 15. Bottom film 11 contacts the top surface of concrete subflooring 15. Planks 17 of laminate wood flooring is positioned on laminate composition 10 in a free-lying manner. Planks 17 fit together by means of tongue-in-groove arrangement 18 and are glued together. Laminate composition 10 is not adhered to laminate wood flooring 17. Top sheet 12 contacts the bottom surface of laminate wood flooring 17. FIG. 3 shows that extended portion 14 of bottom film 11 of one strip of laminate composition 10 underlies the adjacent strip of laminate composition 10. The strip of laminate composition 10 which has its extended portion 14 against a wall can be trimmed or cut to fit.

As an alternative, laminate composition 10 can be installed so that film 11 contacts laminate wood flooring 17 and foam sheet 12 contacts concrete subflooring 15.

Foam sheet 12 itself (or with an additional foam layer) should not be so thick as to provide so much flexing under pressure that the laminate planks 17 are subjected to bending which will cause their glue binding(s) to fail.

If a concrete subflooring has a preexisting floor thereon (e.g., ceramic tile, linoleum, etc.), the invention laminate composition can be placed on top of the preexisting floor or the preexisting floor can be removed before the invention laminate composition is installed.

What is claimed is:

1. A *combination* laminate film-foam composition [for use under] *underlayment and free-floating* laminate wood [floors] *floor, said underlayment adjacent to said free-floating laminate wood floor and* consisting essentially of a laminate of a sheet of polyethylene closed cell foam having a thickness between about 0.03–0.1 inches and a density of about 1–5 pcf and a film of polyethylene having a thickness of about 1–5 mils adhered to said foam sheet, said polyethylene film sheet having a larger surface area than said polyethylene foam sheet, at least one edge of the polyethylene film sheet extending beyond the corresponding edge of the polyethylene foam sheet, wherein said at least one edge of polyethylene film sheet having a length such that it is capable of overlapping an adjacent foam sheet.

2. The *combination* laminate composition *underlayment and free-floating laminate wood floor* of claim 1 wherein the polyethylene film is composed of low density polyethylene, the polyethylene foam sheet is composed of low density polyethylene, and the polyethylene film and the polyethylene foam sheet are adhered together by a layer of low density polyethylene.

3. The *combination* laminate composition *underlayment and free-floating laminate wood floor* of claim [2] *1* wherein the polyethylene foam sheet has a density of about 1.9 pcf to about 2.2 pcf.

4. The *combination* laminate composition *underlayment and free-floating laminate wood floor* of claim 1 wherein the polyethylene film is composed of low density polyethylene.

5. The *combination* laminate composition *underlayment and free-floating laminate wood floor* of claim 1 wherein the polyethylene film has a thickness of about 5 mils.

6. The *combination* laminate composition *underlayment and free-floating laminate wood floor* of claim 1 wherein the polyethylene foam sheet is composed of low density polyethylene.

7. The *combination* laminate composition *underlayment and free-floating laminate wood floor* of claim 6 wherein the polyethylene foam sheet has a density of about 1.9 pcf to about 2.2 pcf.

8. The *combination* laminate composition *underlayment and free-floating laminate wood floor* of claim 7 wherein the polyethylene foam sheet has a thickness of about 0.075 inch.

*9. A combination laminate film-foam composition underlayment and a free-floating laminate wood floor, said underlayment adjacent to said free-floating laminate wood floor and consisting essentially of a laminate of a sheet of polyethylenic resin closed cell foam limiting flexing of said laminate wood floors by having a thickness between about 0.03–0.1 inches and a density of about 1–5 pcf and a film sheet of polyethylenic resin having a thickness of about 1–5 mils, adhered to said foam sheet, said polyethylenic resin film sheet providing a vapor barrier and having a larger surface area than said polyethylenic resin foam sheet, at least one edge of the polyethylenic resin film sheet extending beyond the corresponding edge of the polyethylenic resin foam sheet, wherein said at least one edge of polyethylenic resin film sheet having a length such that it is capable of overlapping an adjacent film sheet.*

*10. A combination laminate film-foam composition underlayment and free-floating laminate wood floor of claim 9 wherein said polyethylenic resin is polyethylene.*

*11. A combination laminate film-foam composition underlayment and free-floating laminate wood floor of claim 10 wherein said polyethylenic resin is low density polyethylene.*

*12. A combination laminate film-foam composition underlayment and free-floating laminate wood floor of claim 9 wherein said polyethylenic resin is cross-linked polyethylene.*

*13. A combination laminate film-foam composition underlayment and free-floating laminate wood floor of claim 9 wherein said polyethylenic resin is a copolymer of ethylene and other ethylenically-unsaturated monomers having from 3 to about 8 carbon atoms.*

*14. A combination laminate film-foam composition underlayment and free-floating laminate wood floor of claim 13 wherein said ethylenically-unsaturated monomers are selected from at least one of the group consisting of propylene, butenes, pentenes, and hexenes.*

*15. A combination laminate film-foam composition underlayment and free-floating laminate wood floor of claim 13 wherein said ethylenically-unsaturated monomers are selected from at least one of the group consisting of vinyl acetate, vinyl chloride, acrylic acid and its esters, and methacrylic acid and its esters.*

*16. A combination laminate film-foam composition underlayment and free-floating laminate wood floor of claim 9 wherein said polyethylenic resin is blended with other polymers.*

*17. A combination laminate film-foam composition underlayment and free-floating laminate wood floor of claim 16 wherein said polymers are selected from the group consisting of polypropylene, polybutadiene, polyisoprene, polychloroprene, chlorinated polyethylene, polyvinyl chloride, styrenebutadiene copolymer, vinyl acetate/ethylene copolymer, acrylonitrile/butadiene copolymer, and vinyl chloride/vinyl acetate copolymer.*

*18. A combination laminate film-foam composition underlayment and a free-floating laminate wood floor, said underlayment adjacent to said free-floating laminate wood floor and consisting essentially of a laminate of a closed cell foam sheet of homopolymers and/or copolymers of polypropylene limiting flexing of said laminate wood floors by having a thickness between about 0.03–0.1 inches and a density of about 1–5 pcf and a film sheet of homopolymers and/or copolymers of polypropylene having a thickness of about 1–5 mils, adhered to said foam sheet, said film sheet of homopolymers and/or copolymers of polypropylene providing a vapor barrier and having a larger surface area than said foam sheet of homopolymers and/or copolymers of polypropylene, at least one edge of the film of homopolymers and/or copolymers of polypropylene extending beyond the corresponding edge of the foam sheet of homopolymers and/or copolymers of polypropylene wherein said at least one edge of film sheet of the homopolymers and/or copolymers of polypropylene having a length such that it is capable of overlapping an adjacent film sheet.*

*19. A combination laminate film-foam composition underlayment and free-floating laminate wood floor of claim 18 wherein said homopolymers and/or copolymers of polypropylene is a homopolymer of polypropylene.*

*20. A combination laminate film-foam composition underlayment and free-floating laminate wood floor of claim 18 wherein said homopolymers and/or copolymers of polypropylene is a copolymer of polypropylene.*

*21. A combination laminate film-foam composition underlayment and free-floating laminate wood floor of claim 18 wherein said homopolymers and/or copolymers of polypropylene are blended with other polymers.*

*22. A combination laminate film-foam composition underlayment and a free-floating laminate wood floor, said underlayment adjacent to said free-floating laminate wood floor and consisting essentially of a laminate of a closed cell foam sheet of polyethylenic resins or homopolymers and/or copolymers of polypropylene limiting flexing of said laminate wood floors by, having a thickness between about 0.03–0.1 inches and a density of about 1–5 pcf and a film sheet of polyethylenic resins or homopolymers and/or copolymers of polypropylene providing a vapor barrier, said film sheet having a thickness of about 1–5 mils, adhered to said foam sheet and having a larger surface area than said foam sheet, at least one edge of the film sheet extending beyond the corresponding edge of the foam sheet, wherein said at least one edge of said film sheet having a length such that it is capable of overlapping an adjacent film sheet.*

*23. A combination laminate film-foam composition underlayment and free-floating laminate wood floor of claim 22 wherein said polyethylenic resin is polyethylene.*

*24. A combination laminate film-foam composition underlayment and free-floating laminate wood floor of claim 22 wherein said polyethylenic resin or homopolymers and/or copolymers of polypropylene is blended with other polymers.*

*25. A combination laminate film-foam composition underlayment and free-floating laminate wood floor of claim 22 wherein said homopolymers and/or copolymers of polypropylene is a homopolymer of polypropylene.*

*26. A combination laminate film-foam composition underlayment and free-floating laminate wood floor of claim 22 wherein said homopolymers and/or copolymers of polypropylene is a copolymer of polypropylene.*

* * * * *